(12) United States Patent
Randolph (10) Patent No.: US 12,090,806 B2
(45) Date of Patent: Sep. 17, 2024

(54) VEHICLE HYDRAULIC SUSPENSION SYSTEM CONTROLLER

(71) Applicant: Curtis Randolph, Pacioma, CA (US)

(72) Inventor: Curtis Randolph, Pacioma, CA (US)

( * ) Notice: Subject to any disclaimer, the term of this patent is extended or adjusted under 35 U.S.C. 154(b) by 121 days.

(21) Appl. No.: 16/942,282

(22) Filed: Jul. 29, 2020

(65) Prior Publication Data

US 2022/0032706 A1   Feb. 3, 2022

(51) Int. Cl.
| | | |
|---|---|---|
| *B60G 17/015* | (2006.01) | |
| *B60G 17/00* | (2006.01) | |
| *B60G 17/0185* | (2006.01) | |
| *B60G 17/019* | (2006.01) | |
| *B60G 17/0195* | (2006.01) | |
| *B60K 35/00* | (2024.01) | |
| *B60K 35/10* | (2024.01) | |
| *B60K 35/22* | (2024.01) | |

(52) U.S. Cl.
CPC ..... *B60G 17/0152* (2013.01); *B60G 17/0185* (2013.01); *B60G 17/019* (2013.01); *B60G 17/0195* (2013.01); *B60K 35/00* (2013.01); *B60G 17/00* (2013.01); *B60G 2400/70* (2013.01); *B60G 2400/90* (2013.01); *B60K 35/10* (2024.01); *B60K 35/22* (2024.01)

(58) Field of Classification Search
CPC .............. B60G 17/0185; B60G 17/019; B60G 17/0195; B60G 17/00; B60G 2400/70; B60G 2600/202; B60K 2370/1537
See application file for complete search history.

(56) References Cited

U.S. PATENT DOCUMENTS

| | | | | |
|---|---|---|---|---|
| 4,700,972 A * | 10/1987 | Young | ................ | B60G 17/0195 280/5.521 |
| 5,041,977 A * | 8/1991 | Kawabata | .......... | B60G 17/0185 280/5.501 |
| 5,042,833 A * | 8/1991 | Kawabata | .......... | B60G 17/0185 280/5.501 |
| 5,143,386 A * | 9/1992 | Uriarte | ...................... | B60S 9/02 180/41 |
| 5,325,082 A * | 6/1994 | Rodriguez | .......... | B60R 16/0315 340/459 |
| 5,527,059 A * | 6/1996 | Lee, Jr. | ................. | B60G 17/016 280/43.23 |
| 5,785,576 A * | 7/1998 | Belton | ................. | A63H 17/262 446/466 |
| 5,884,206 A * | 3/1999 | Kim | ....................... | G05B 15/02 701/32.7 |
| 6,383,054 B1 * | 5/2002 | Rauch | .................. | A63H 17/262 446/466 |
| 7,062,367 B2 * | 6/2006 | Kim | ...................... | B60G 17/08 701/2 |

(Continued)

*Primary Examiner* — Amy R Weisberg
*Assistant Examiner* — Tiffany L Webb
(74) *Attorney, Agent, or Firm* — The Rapacke Law Group, P.A.

(57) ABSTRACT

A hydraulic suspension system controller connected with a hydraulic system of a vehicle. The controller includes a display, an indicator and buttons corresponding to functions of the controller. Each function is associated with the hydraulic system for raising and lowering solenoids connected to a hydraulic actuator to extend or contract the hydraulic actuator. A fail-safe module is connected to the controller to receive signals from a sensor array to monitor the hydraulic system.

18 Claims, 5 Drawing Sheets

(56) References Cited

U.S. PATENT DOCUMENTS

| | | | | |
|---|---|---|---|---|
| 8,892,055 B2* | 11/2014 | Gasperi | .................. | H02J 50/20 |
| | | | | 700/12 |
| 9,027,937 B2* | 5/2015 | Ryan | ...................... | B60G 17/08 |
| | | | | 280/5.519 |
| 9,428,242 B2* | 8/2016 | Ginther | ................... | B62K 25/04 |
| 9,662,954 B2* | 5/2017 | Brady | ................... | B60G 17/08 |
| 10,933,710 B2* | 3/2021 | Tong | .................... | B60G 17/018 |
| 11,083,973 B2* | 8/2021 | Egli | ..................... | A63H 17/262 |
| 2014/0371978 A1* | 12/2014 | Hagenbuch | ............ | G07C 5/008 |
| | | | | 701/32.2 |
| 2019/0308481 A1* | 10/2019 | Kabasawa | ........ | B60G 17/01908 |
| 2021/0172463 A1* | 6/2021 | Tucker | ................... | B60G 15/08 |
| 2021/0309063 A1* | 10/2021 | Negishi | ................ | B60G 17/016 |

\* cited by examiner

VEHICLE HYDRAULIC SUSPENSION SYSTEM CONTROLLER

TECHNICAL FIELD

The embodiments relate to hydraulic system controllers, and, more specifically, relate to vehicle hydraulic system controllers having integrated safety features.

BACKGROUND

A lowrider is a customized vehicle used for transportation as well as for entertainment due to their unique appearance and physical characteristics. Often, the vehicle is fitted with hydraulic or airbag systems. Airbag systems allow for the vehicle to be raised and lowered to adjust the ride height of the vehicle while stationary or while moving. Hydraulic systems allow the vehicle to jump, hop, and bounce due to the rapid expansion of pressurized fluid within the bladder (i.e., hydraulic actuator) replacing the vehicles spring suspension.

Pumps required to operate the hydraulic system draw a large amount of power, often requiring several batteries to be operational. The hydraulic actuator is attached to a compressor, which rapidly forces the liquid into the hydraulic actuator, causing it to expand. Bladders are positioned at each corner of the vehicle and can be independently controlled using a solenoid valve that can be switched to perform various maneuvers.

In some cases, hydraulic systems provide enough force to render the car unsafe when the hydraulics are operating due to the height the car is capable of hopping or bouncing. In this case, the hydraulic system is controlled via a remote controller having a plurality of switches to allow the operator to selectively control the vehicle. The controller may also be hard-wired into the vehicle in application wherein the vehicle is safe to inhabit during operation of the hydraulic or airbag suspension system. In particular, due to the excessive power required to operate the hydraulic suspension systems commonly used in lowriders, safety is of concern. Fires are known to occur, particularly during operation of the hydraulic system when performing hops, bounces, and dancing. No systems in the current arts provide a safety mechanism to aid in the prevention of a fire, or to aid in the prevention of the failure of the hydraulic system.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The embodiments disclosed herein provide a hydraulic suspension system controller, comprising a controller in operable communication with a hydraulic system of a vehicle. The controller includes at least one display, at least one indicator, and a plurality of buttons, wherein each button corresponds to a function of the controller, and wherein each function affects the hydraulic system to raise and lower at least one of a plurality of solenoids each in operable communication with a hydraulic actuator to extend or contract the hydraulic actuator. A fail-safe module is in operable communication with the controller, the fail-safe module receiving a plurality of signals from a sensor array to monitor the hydraulic system.

The hydraulic system controller is in operable communication with a memory to perform data logging, recording, and storage of information related to the operation of the hydraulic system of the vehicle. The systems goal is to operate the hydraulic system in a safe manner to promote and facilitate prolonged use of the system. In such, the system can store operational functions that were previously performed, allowing the user to select for the previously performed function via selecting one or more buttons on the controller. Operational functions may also be predownloaded to the memory of the controller. the algorithm for safe hydraulic operation parameters is also computer, and cell phone driven to allow users to upload datasets in categorized by time, days, or weeks in order to evaluate potential strengths and weakness of the hydraulic system to further maximize proficient operation the hydraulic system.

The embodiments provide a vehicle hydraulic system controller in operable communication with the hydraulic system of a vehicle to permit the operator to extend and contract the actuators via the remote control of the solenoids. The controller may be in wired or wireless communication with the vehicle, such that the user does not need to be seated within the vehicle during operation of the controller and hydraulic system connected thereto. The controller includes a printed circuit board (PCB) including circuitry to operate the various functionalities described herein. The system includes a hydraulic system monitor or monitoring system, which analyzes input received from a sensor array to determine if the hydraulic system and other vehicle systems are operating safely to prevent fires, hydraulic system fatigue and/or damage, and the like. In such, the monitoring system may operate a fail-safe system to turn off, disconnect, or otherwise inactivate the hydraulic system if the monitoring system indicates a potential hazard.

In one aspect, the controller is in wireless communication with the hydraulic system.

In one aspect, the sensor array comprises at least one of the following: a heat sensor and a temperature sensor.

In one aspect, the PCB is in operable communication with at least one of the following: a potentiometer and a voltmeter.

In one aspect, the PCB is in operable communication with a plurality of batteries.

In one aspect, the PCB comprises an auxiliary board.

In one aspect, the PCB comprises a transmitter and a receiver and sends and receives information to and from the controller.

In one aspect, the sequence module receives input from the programmer to operate the hydraulic system.

In one aspect, the analytics module receives information from the sensor array to determine a threshold, wherein exceeding the threshold transmits an alert signal to the emergency module.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

The specific details of the single embodiment or variety of embodiments described herein are to the described system. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the systems. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as "first" and "second" and the like, may be used solely to distinguish one entity or element from another entity or element without necessarily requiring or implying any physical or logical relationship, or order between such entities or elements.

In general, the embodiments provided herein relate to a vehicle hydraulic system controller in operable communication with the hydraulic system of a vehicle to permit the operator to extend and contract the actuators via the remote control of the solenoids. The controller may be in wired or wireless communication with the vehicle, such that the user does not need to be seated within the vehicle during operation of the controller and hydraulic system connected thereto. The controller includes a printed circuit board (PCB), including circuitry to operate the various functionalities described herein. The system includes a hydraulic system monitor or monitoring system, which analyzes input received from a sensor array to determine if the hydraulic system and other vehicle systems are operating safely to prevent fires, hydraulic system fatigue and/or damage, and the like. In such, the monitoring system may operate a fail-safe system to turn off, disconnect, or otherwise inactivate the hydraulic system if the monitoring system indicates a potential hazard.

Figure 1:
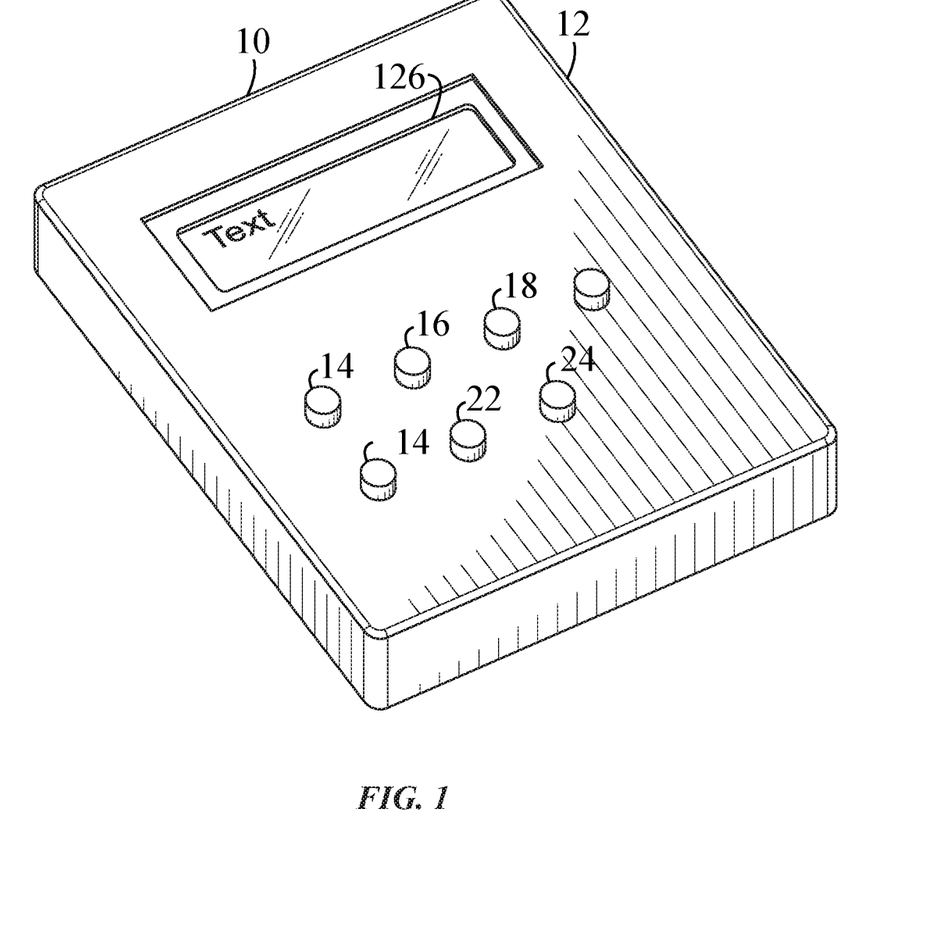
FIG. 1 illustrates a perspective view of the hydraulic suspension system controller, according to some embodiments.

FIG. 1 illustrates a perspective view of the controller 10 including a housing 12 to contain the various electrical components operating the various functionalities of the controller 10. A plurality of buttons 14,18,20,22,24 to permit the user to provide input. The buttons 14,18,20,22,24 may include functions including ON/OFF, up, down, and the like. For example, the buttons 14,18,20,22,24 may allow the user to selectively control the hydraulic system of the vehicle by indicating a corner of the vehicle and an up/down function to allow the user to selectively control the solenoids of the hydraulic system. This allows the user to perform maneuvers such as bouncing, hopping, dancing, etc. known in the arts of vehicle hydraulic controls, especially those implemented in "lowrider" vehicles. In another example, the user may select "up" for the front left and front right corners of the vehicle causing the front of the vehicle to bounce. A display 126 is provided to allow the user to view and select operational settings, view diagnostics of the vehicle and/or the hydraulic system, and the like.

In some embodiments, the plurality of buttons include a front left corner up, front left corner down, front right corner up, front right corner down, rear left corner up, rear left corner down, rear right corner up, and rear right corner down buttons.

In some embodiments, the housing is hermetically sealed, or at least water and dust resistant, to provide sufficient protection to the electrical components therein.

Figure 2:
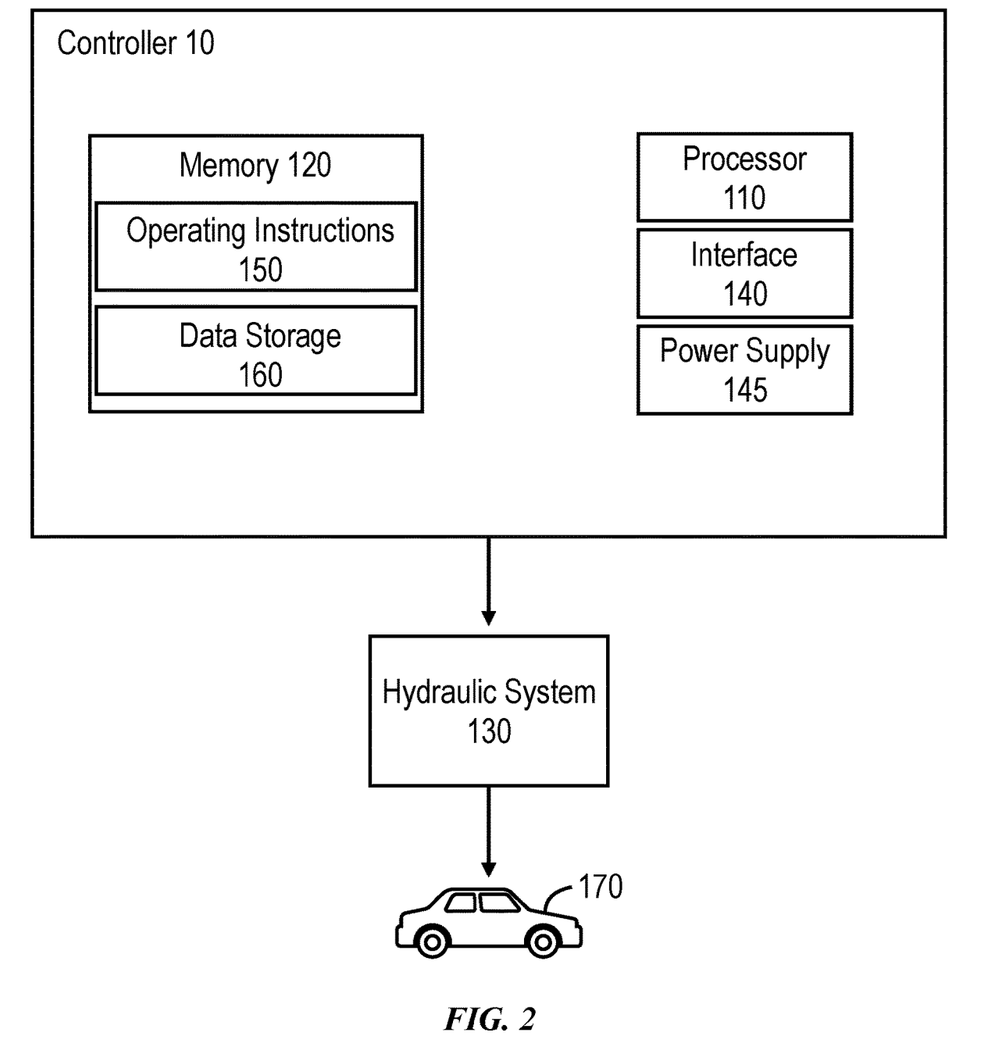
FIG. 2 illustrates a block diagram of the controller, vehicle, and hydraulic systems in operable communication with one another, according to some embodiments.

FIG. 2 illustrates a block diagram of the controller 10 in operable communication with the hydraulic system 130 and vehicle 170 with which the hydraulic system 130 is connected. The controller may comprise a processor 110 to operate the various operating functions 150 stored in the memory 120. Similarly, data storage 160 comprises various data accessible by the operating functions 150. The controller may further include an interface 140 to communicate with the hydraulic system 130 via a wireless network, near-frequency communication system, or the like. A power supply 145 provides power input to the controller. The power supply 145 may be one or more batteries, solar cells, or other power sources known in the arts.

The hydraulic system controller is in operable communication with a memory to perform data logging, recording, and storage of information related to the operation of the hydraulic system of the vehicle. The systems goal is to operate the hydraulic system in a safe manner to promote and facilitate prolonged use of the system. In such, the system can store operational functions that were previously performed, allowing the user to select for the previously performed function via selecting one or more buttons on the controller.

In some embodiments, operational functions may also be predownloaded to the memory of the controller and allow the user to easily select the operational functions stored therein. The algorithm for safe hydraulic operation parameters is also computer, and cell phone driven to allow users to upload datasets in categorized by time, days, or weeks in order to evaluate potential strengths and weakness of the hydraulic system to further maximize proficient operation the hydraulic system.

In some embodiments, the controller and/or the functionalities thereof may be integrated into the vehicles instrument cluster for seamless integration.

Processors suitable for the execution of a computer program include both general and special purpose microprocessors and any one or more processors of any digital computing device. The processor 110 will receive instructions and data from a read-only memory or a random-access memory or both.

The interface 140 may be configured to allow data to be exchanged between the controller 10 and vehicle 170 and/or hydraulic system 130, and other devices in communication therewith, such as other computer systems. In various embodiments, the interface 140 may support communication via wired or wireless general data networks.

The memory 120 may include operating instructions 150, configured to implement certain embodiments described herein, and a data storage 160, comprising various data accessible by the operating instructions.

Figure 3:
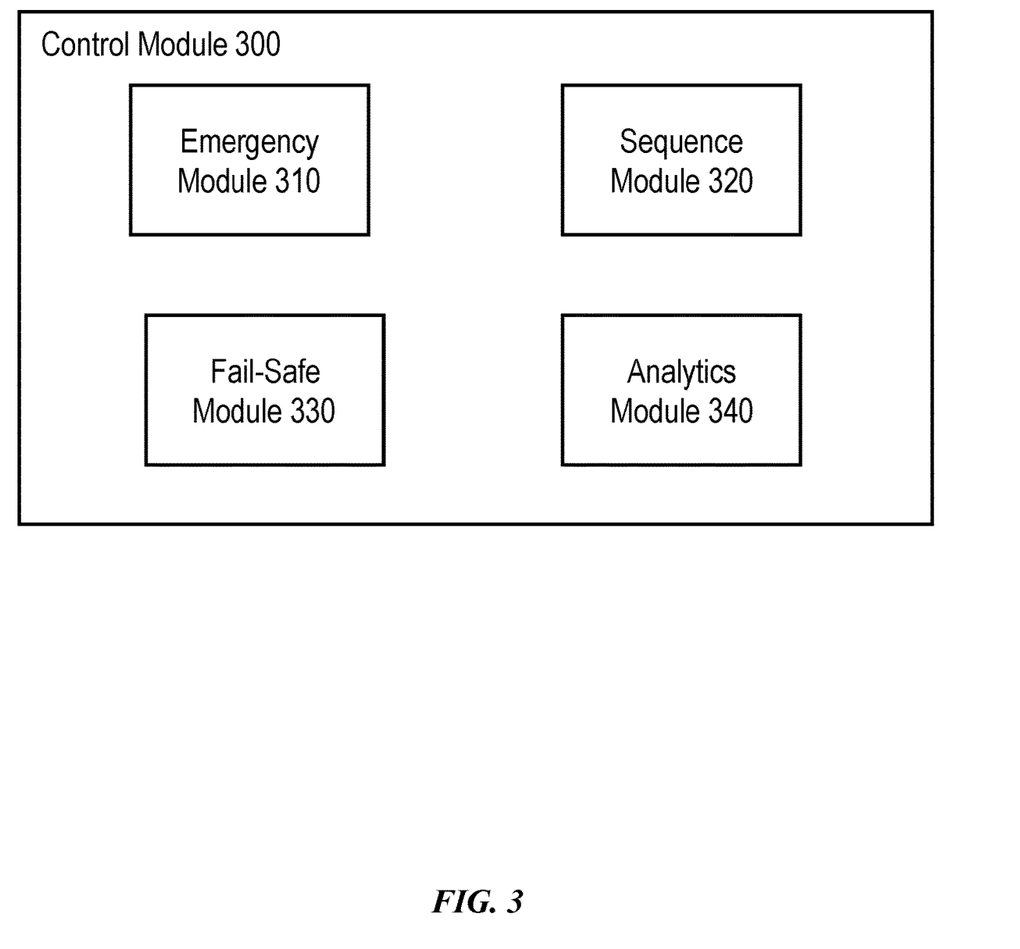
FIG. 3 illustrates a block diagram of the controller module, according to some embodiments.

FIG. 3 illustrates a control module 300 in operable communication with the controller. The control module comprises an emergency module 310, a sequence module 320, a fail-safe module 330, and an analytics module 340. The emergency module 310 and fail-safe module 330 receive output signals from the analytics module 340, which analyzes signals received from a sensor array 550 to determine if various thresholds have been exceeded, which may indicate a safety concern such as a fire or failure of the hydraulic system. For example, the fail-safe module may default to an OFF setting if a temperature sensor exceeds a predetermined threshold. The emergency module 310 may modify output signals from the controller to the hydraulic system if operational instructions may risk the safety of the user or the integrity of the hydraulic system. For example, the emergency system may reduce the number of up or down inputs selected by the user.

Figure 4:
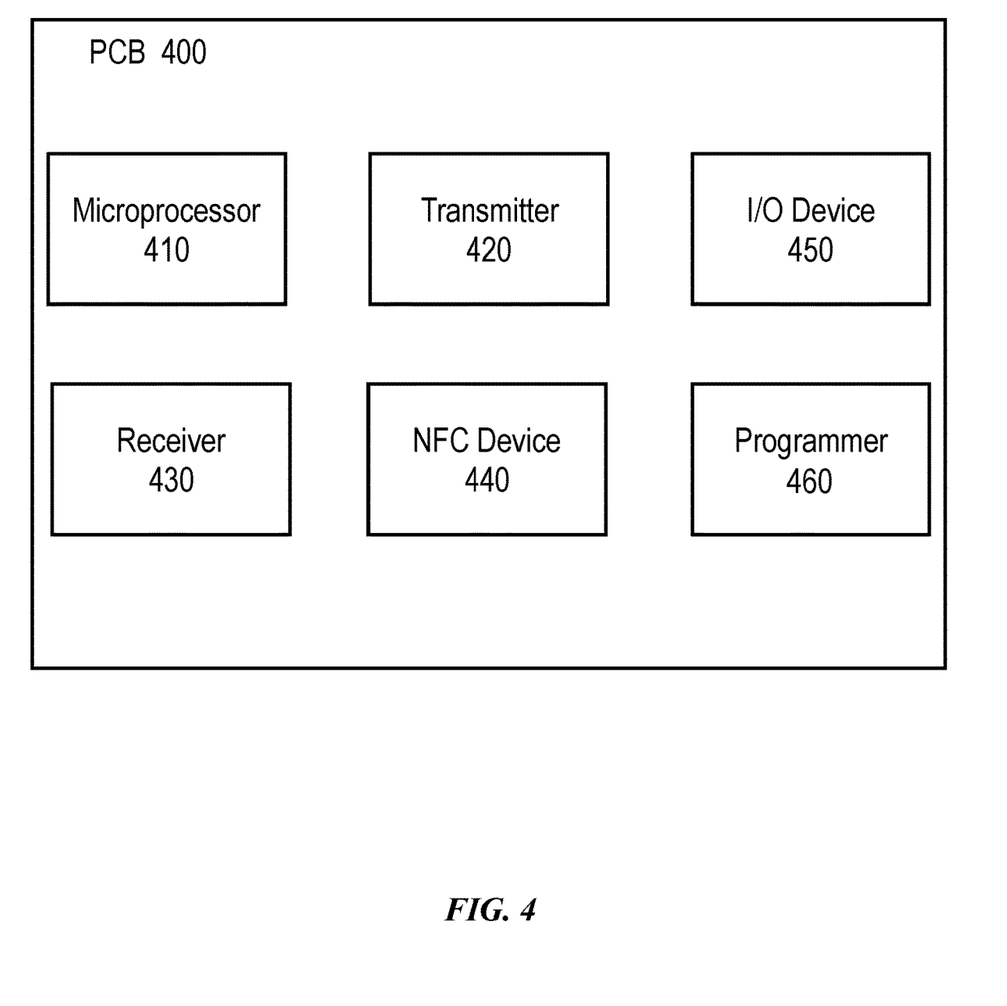
FIG. 4 illustrates a block diagram of the PCB, according to some embodiments.

FIG. 4 illustrates a block diagram of the PCB 400 in operable communication with the controller. The PCB may be in operable communication with a microprocessor 410, transmitter 420, receiver 430, near-frequency communication device 440, I/O device 450 and programmer 460. The microprocessor 410 effects the various features via the central processing unit to accept data from the memory 120 and operate the functionalities of the controller 10. The transmitter 420 and receiver 430 send and receive data to and from the controller 10 to operate the hydraulic system 130 connected to the vehicle 170. The I/O device 450 provides an input/output functionality to the user known systems in the arts. The programmer 460 provides a means for receiving operation functions from the user in addition to stored settings from the memory 120 to operate the hydraulic system 130 of the vehicle 170.

Figure 5:
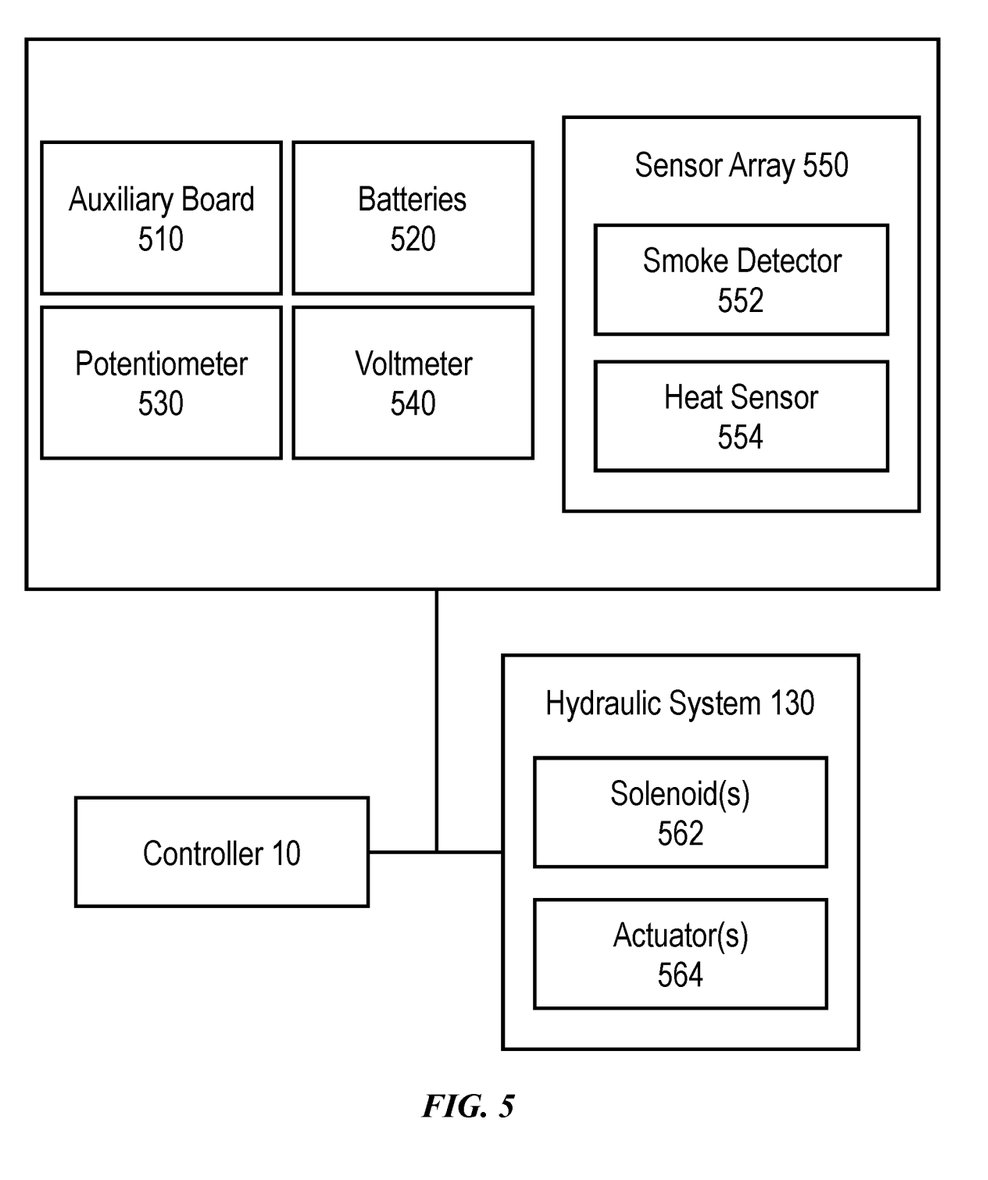
FIG. 5 illustrates a block diagram of the system, according to some embodiments.

FIG. 5 illustrates a block diagram of the system including the controller 10 in operable communication with the hydraulic system 130 having a plurality of solenoids 562 and actuators 564 connected thereto to permit the user to selectively, via the controller 10, raise and lower the corners of the vehicle. A sensor array 550 is positioned within the vehicle 170 or in a suitable location to monitor the hydraulic system 130 and/or vehicle environment during operation of the hydraulic system 130. The sensor array 550 may include a smoke detector 552 and a heat sensor 554 to indicate if a fire is active within the vehicle or if a fire is imminent due to excess heat. A potentiometer 530 or voltmeter 540 is in operable communication with the batteries 520 to measure voltage produced therefrom during operation of the hydraulic system 130. An auxiliary board 510 provides auxiliary input to the controller 10 if required by the user.

The embodiments permit the user to monitor operating conditions of the hydraulic system 130 via the controller 10 to prevent or reduce the likelihood of a fire occurring due to the overexertion of the hydraulic system 130 of the vehicle 170.

In some embodiments, the PCB 400 controls voltages ranging from 12 vdc to 138 vdc using a 4-digit 7-segment voltage monitoring LCD display.

In some embodiments, indicator lights may be provided on the housing 12 of the controller 10. For example, a green indicator light may indicate normal operating conditions, while a red indicator light may indicate a fault in the system, hazardous conditions measured by the sensor array 550, and the like.

In some embodiments, the controller 10 may be in operable communication with a computing device, such as a smartphone, laptop computer, tablet, and the like. In such, the user may operate the controller 10, monitor operation conditions of the hydraulic system 130, view diagnostics, or otherwise interact with the controller 10, vehicle 170, and/or hydraulic system 130 using the connected computing device.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A hydraulic suspension system controller, comprising:
    a portable controller unit in operable communication with a hydraulic system of a vehicle, the controller comprising at least one display, at least one indicator, and a plurality of buttons, wherein each button corresponds to a function of the controller, and wherein each function effects the hydraulic system to raise and lower at least one of a plurality of solenoids each in operable communication with a hydraulic actuator to extend or contract the hydraulic actuator;
    a fail-safe module in operable communication with the controller unit, the fail-safe module receiving a plurality of signals from a sensor array to monitor the hydraulic system; and
    a memory in operable communication with the controller unit, the memory to store a plurality of operational functions and permit a user to select the plurality of operational functions using the plurality of buttons on the controller unit;
    an analytics module configured to receive readings from the sensor array and, responsive to the readings exceeding a threshold, to transmit an alert signal to an emergency module,
    wherein, the at least one indicator comprises an indicator light positioned on a housing of the controller unit configured to indicate normal or faulty operating conditions.

2. The controller of claim 1, wherein the controller is in wireless communication with the hydraulic system.

3. The controller of claim 1, wherein the sensor array comprises at least one of the following: a heat sensor and a temperature sensor.

4. The controller of claim 3, further comprising a potentiometer and a voltmeter.

5. The controller of claim 4, further comprising a plurality of batteries.

6. The controller of claim 5, further comprising an auxiliary board configured to provide an auxiliary input to the controller.

7. The controller of claim 6, further comprising a transmitter and a receiver configured to send and receive information to and from the controller.

8. The controller of claim 7, wherein a sequence module is configured to receive an input to operate the hydraulic system.

9. A hydraulic suspension system controller, comprising:
a portable controller unit in operable communication with a hydraulic system of a vehicle, the controller comprising at least one display, at least one indicator, and a plurality of buttons, wherein each button corresponds to a function of the controller, and wherein each function effects the hydraulic system to raise and lower at least one of a plurality of solenoids each in operable communication with a hydraulic actuator to extend or contract the hydraulic actuator to cause the vehicle to hop, bounce, or dance;
a fail-safe module in operable communication with the controller unit, the fail-safe module receiving a plurality of signals from a sensor array to monitor the hydraulic system; and
at least one indicator light to indicate normal or faulty operating conditions, wherein the at least one indicator light is positioned on a housing of the controller unit;
an analytics module configured to receive readings from the sensor array and, responsive to the readings exceeding a threshold, to transmit an alert signal to an emergency module; and
a memory in operable communication with the controller unit, the memory to store a plurality of operational functions and permit a user to select the plurality of operational functions using the plurality of buttons on the controller unit, wherein the memory stores safe operating data and mimics operating functions corresponding to the safe operating data.

10. The controller of claim 9, wherein the controller is in wireless communication with the hydraulic system.

11. The controller of claim 10, wherein the sensor array comprises at least one of the following: a heat sensor and a temperature sensor.

12. The controller of claim 11, further comprising a potentiometer and a voltmeter.

13. The controller of claim 12, further comprising a plurality of batteries.

14. The controller of claim 13, an auxiliary board configured to provide an auxiliary input to the controller.

15. The controller of claim 14, further comprising a transmitter and a receiver configured to send and receive information to and from the controller.

16. The controller of claim 15, wherein a sequence module is configured to receive an input to operate the hydraulic system.

17. The controller of claim 16, wherein the plurality of buttons includes a front left corner up, front left corner down, front right corner up, front right corner down, rear left corner up, rear left corner down, rear right corner up, and rear right corner down functions.

18. A hydraulic suspension system controller, comprising:
a portable controller unit including a housing and a plurality of buttons, the controller unit in operable communication with a hydraulic system of a vehicle, the controller unit comprising at least one display, at least one indicator, and a plurality of buttons, wherein each button corresponds to a function of the controller unit, and wherein each function effects the hydraulic system to raise and lower at least one of a plurality of solenoids each in operable communication with a hydraulic actuator to extend or contract the hydraulic actuator;
a fail-safe module in operable communication with the controller unit, the fail-safe module receiving a plurality of signals from a sensor array to monitor the hydraulic system; and
an analytics module configured to receive readings from the sensor array and, responsive to the readings exceeding a threshold, to transmit an alert signal to an emergency module;
at least one indicator light to indicate normal or faulty operating conditions, wherein the at least one indicator light is positioned on a housing of the controller unit.

* * * * *